United States Patent
Tatara et al.

(10) Patent No.: US 8,952,614 B2
(45) Date of Patent: Feb. 10, 2015

(54) POWER SUPPLY DEVICE FOR VEHICLE LAMP AND THE VEHICLE LAMP

(75) Inventors: Naohisa Tatara, Shizuoka (JP); Naoki Tatara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 95 days.

(21) Appl. No.: 13/554,667

(22) Filed: Jul. 20, 2012

(65) Prior Publication Data
US 2013/0020937 A1 Jan. 24, 2013

(30) Foreign Application Priority Data
Jul. 21, 2011 (JP) .................................. 2011-159736

(51) Int. Cl.
| | | |
|---|---|---|
| *H01K 7/00* | (2006.01) | |
| *B60Q 1/14* | (2006.01) | |
| *B60Q 1/02* | (2006.01) | |
| *H05B 37/02* | (2006.01) | |
| *B60Q 1/00* | (2006.01) | |

(52) U.S. Cl.
CPC .......... *H05B 37/0272* (2013.01); *B60Q 1/0094* (2013.01); *B60Q 2900/30* (2013.01)
USPC .................................. 315/76; 315/77; 315/82

(58) Field of Classification Search
None
See application file for complete search history.

(56) References Cited

U.S. PATENT DOCUMENTS

| | | | | |
|---|---|---|---|---|
| 5,124,895 A | * | 6/1992 | Segoshi et al. ................ | 362/265 |
| 5,680,098 A | * | 10/1997 | Bejster et al. ................. | 340/458 |
| 2009/0026959 A1 | * | 1/2009 | Lin et al. ........................ | 315/77 |

FOREIGN PATENT DOCUMENTS

| | | |
|---|---|---|
| JP | 2001-057744 A | 2/2001 |
| JP | 2002-170407 A | 6/2002 |

\* cited by examiner

*Primary Examiner* — Douglas W Owens
*Assistant Examiner* — Dedei K Hammond
(74) *Attorney, Agent, or Firm* — Sughrue Mion, PLLC

(57) ABSTRACT

A vehicle lamp includes: a light source; a lamp housing that accommodates the light source inside; and a power receiving section that is provided so as to be integral with the lamp housing and is configured to receive electric power wirelessly to supply the electric power to the light source. A power supply device that supplies electric power from a battery mounted on a vehicle to a lamp disposed in the vehicle includes a power transmission section that is provided in the vehicle and configured to transmit the electric power of the battery; and a power receiving section that is provided so as to be integral with the lamp and configured to receive the electric power from the power transmission section. The power transmission section and the power receiving section are disposed to be opposed to each other and electrically coupled by electromagnetic induction.

14 Claims, 5 Drawing Sheets

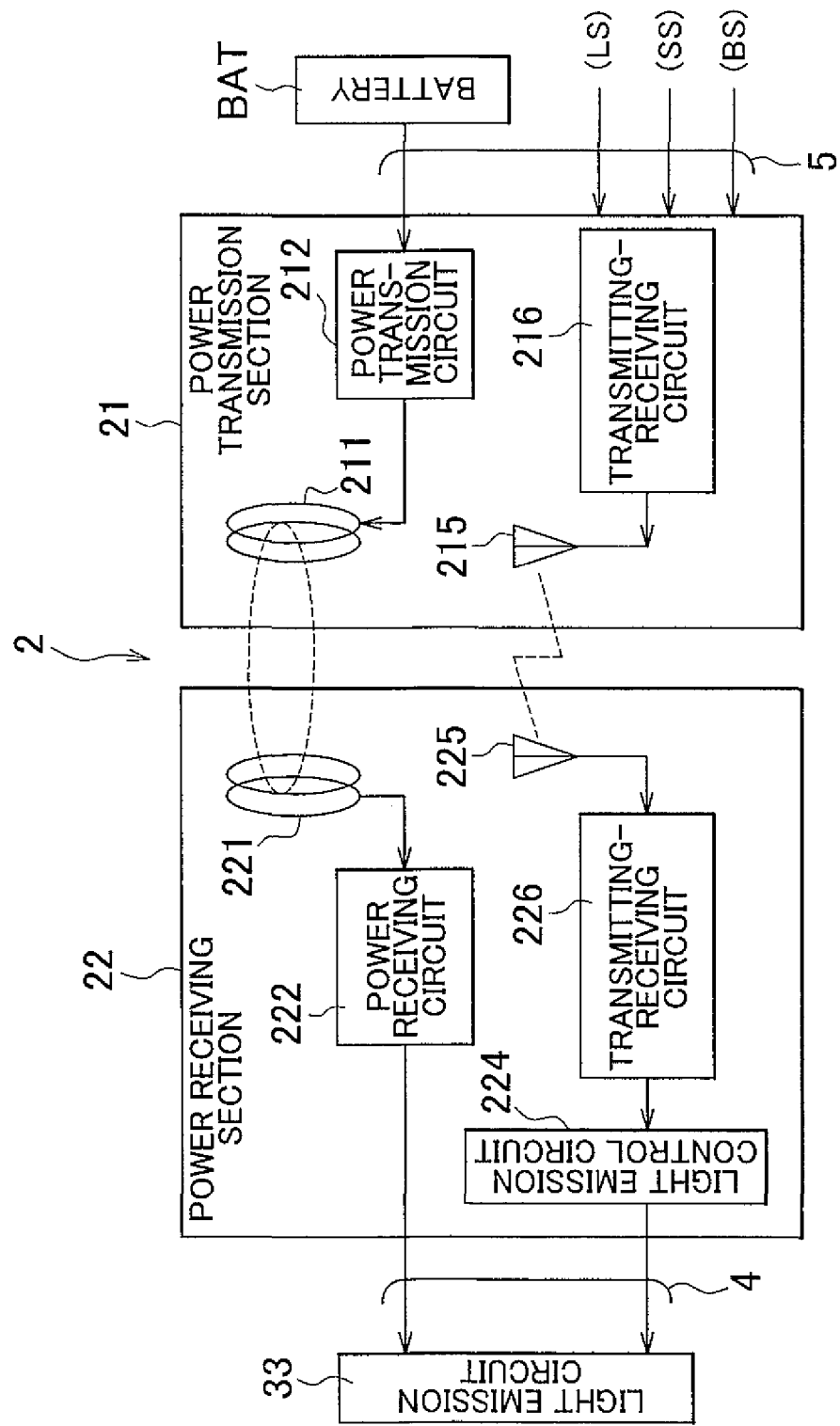

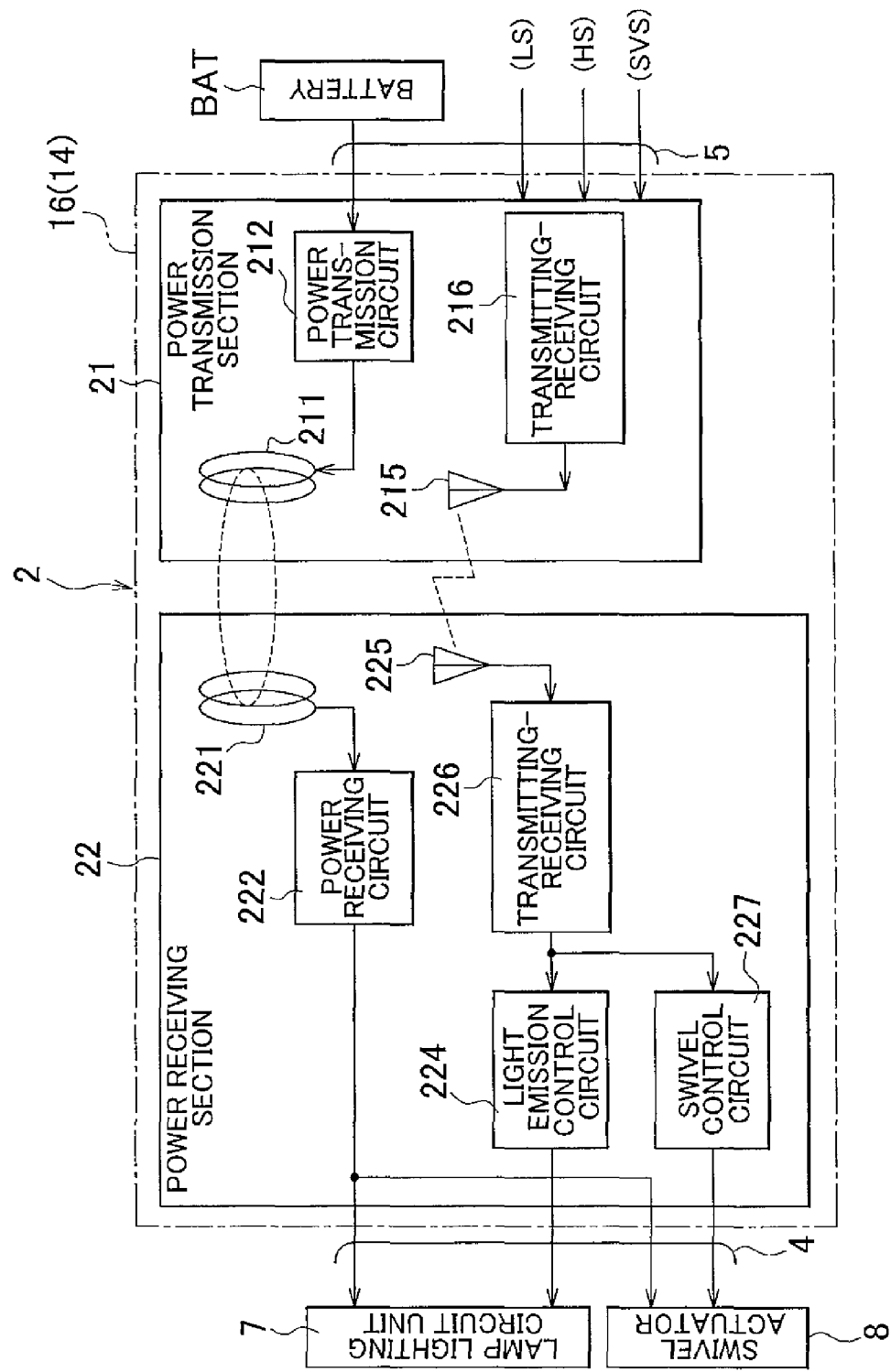

POWER SUPPLY DEVICE FOR VEHICLE LAMP AND THE VEHICLE LAMP

INCORPORATION BY REFERENCE

The disclosure of Japanese Patent Application No. 2011-159736 filed on Jul. 21, 2011 including the specification, drawings and abstract is incorporated herein by reference in its entirety.

BACKGROUND OF THE INVENTION

1. Field of the Invention

The present invention relates to a power supply device for supplying electric power from an on-vehicle power source to lamps that are disposed in a vehicle such as an automobile, and particularly to a power supply device with improved mechanical and electrical reliability. In addition, the present invention relates to a vehicle lamp in which the electric power can be supplied through the power supply device with improved mechanical and electrical reliability.

2. Description of the Related Art

The vehicle lamp for automobiles and the like is constructed to be equipped with a light source and other components in a tamp housing and supply electric power from the on-vehicle power source such as an on-vehicle battery to the light source to turn on the lamp or supply electric power to the other components to drive. Therefore, the tamp housing is provided with a power supply device for establishing electrical connection with the on-vehicle power source. Conventionally, the power supply device is constructed as an electrical connecting device that has conductive contacts such as an electrical socket and an electrical connector. Japanese Patent Application Publication No. 2002-170407 (JP 2002-170407 A) discloses a structure in which a connection connector that is connected to a light source side connector establishing electrical connection with the light source in the lamp housing is disposed at a part of the lamp housing in a state where the connection connector is exposed to the outside, and a power source side connector that is connected to the on-vehicle battery is connected to the connection connector to supply electric power from the on-vehicle battery to the lamp.

In the power supply device having a connector structure as disclosed in JP 2002-170407 A, because a conductive contact made of metals or the like for establishing electrical connection between the lamp side and the power source side is exposed to the outside of the lamp housing, faulty electrical connection tends to occur from corrosion or deterioration of the conductive contact and also from deformation thereof by external forces, which reduces electrical and mechanical reliability of the power supply device. In addition, in order to construct such a type of the power supply device, an opening through which the conductive contact is inserted is required to be provided in the lamp housing, and therefore the lamp housing is required to have waterproof measure and dust protection, which makes the structure of the lamp complicated. This impairs the achievement of reduction in size and cost.

SUMMARY OF THE INVENTION

The present invention provides a power supply device, in which mechanical and electrical reliability in a power supply section for a lamp is improved, and a vehicle lamp, in which the electric power can be supplied through such a power supply device.

A first aspect of the present invention is a power supply device that supplies electric power from a power source mounted on a vehicle to a lamp disposed in the vehicle, including: a power transmission section that is provided in the vehicle and configured to transmit the electric power of the power source; and a power receiving section that is provided so as to be integral with the lamp and configured to receive the electric power from the power transmission section, in which the power transmission section and the power receiving section are disposed to be opposed to each other and electrically coupled wirelessly.

A second aspect of the present invention is a vehicle lamp including the power supply device according to the first aspect. A third aspect of the present invention is a vehicle lamp including: a light source; a lamp housing that accommodates the light source inside; and a power receiving section that is provided so as to be integral with the lamp housing and is configured to receive electric power wirelessly to supply the electric power to the light source. The vehicle lamp of the third aspect may further include a power transmission section that is provided outside the lamp housing and is configured to be connected to a power source to transmit electric power of the power source wirelessly, and the power transmission section and the power receiving section may be disposed to be opposed to each other to be electrically coupled wirelessly.

According to the present invention, the electric power is transmitted from the power transmission section to the power receiving section wirelessly, and therefore the lamp does not need to be provided with an electric connector having a conductive contact for supplying electric power. Thus, corrosion or deterioration of the conductive contact does not occur by exposure of the conductive contact to the outside of the lamp housing, the deformation of the conductive contact by external forces does not occur. Thus, the power supply device with high electrical and mechanical reliability can be obtained. Japanese Patent Application Publication No. 2001-57744 (JP 2001-57744 A) discloses a structure in which the power source and electrical components including a lamp are electrically connected through an electromagnetic induction section. In the technique disclosed in JP 2001-57744 A, the electromagnetic induction section is disposed at a movable part of the vehicle, and the power receiving side of the electromagnetic induction section is electrically connected to the electrical component such as the lamp through a harness. In the device disclosed in JP 2001-57744 A, the electromagnetic induction section is not provided so as to be integral with the lamp unlike the present invention, and therefore the electric connector having the conductive contact is required at a connecting part to connect the lamp and the harness, and the background art cannot solve the problem to be solved by the present invention.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is a block circuit diagram of the power supply device according to a second embodiment;

FIG. 5 is a block circuit diagram of the power supply device according to the third embodiment.

DETAILED DESCRIPTION OF EMBODIMENTS (First Embodiment)

Figure 1:
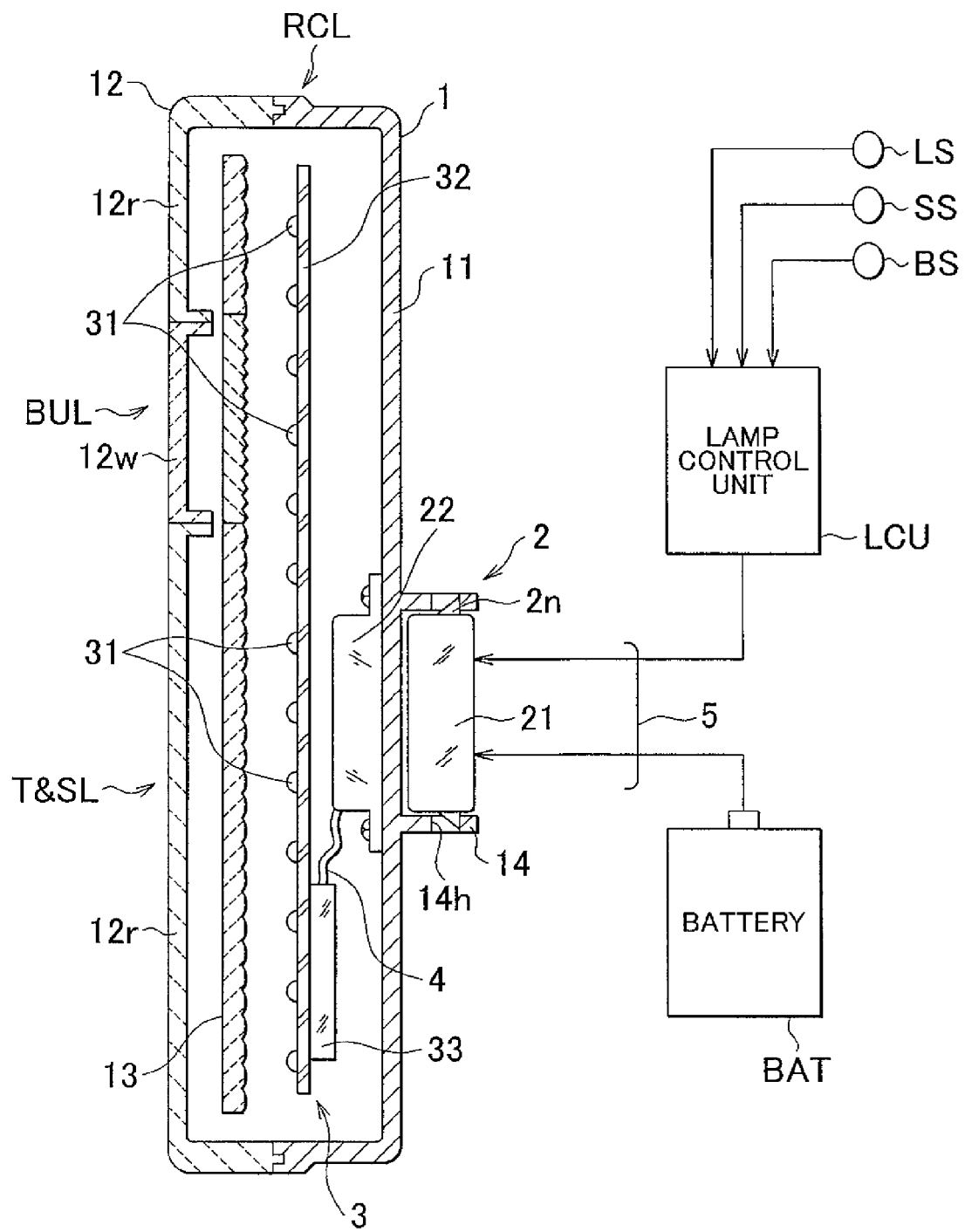
FIG. 1 is a cross-sectional view that shows a schematic configuration of a first embodiment in which a power supply device according to the present invention is applied to a rear combination lamp.

Hereinafter, embodiments of the present invention will be described with reference to attached drawings. FIG. 1 is a horizontal cross-sectional view of a first embodiment in which the present invention is applied to a combination lamp that is disposed in the rear of a vehicle body of an automobile, that is, a rear combination lamp RCL. The rear combination lamp RCL is constructed as a unit, in which plural lamps that include a tail and stop lamp T&SL integrating a tail lamp and a stop lamp into one unit, and a back-up lamp BUL in this embodiment are integrated in a lamp housing 1. Each lamp described above is supplied with electric power from an on-vehicle battery BAT through a power supply device 2 according to the present invention, and lighting of each lamp is controlled by a lamp control signal from a lamp control unit LCU provided in the automobile.

The lamp housing 1 includes a lamp body 11 in a shallow dish shape and an outer lens 12 mounted on a front opening of the lamp body 11 and made of a light transmissive resin. The outer lens 12 is provided as a composite lens, in which a red lens section 12r corresponding to the tail and stop lamp T&SL and a white lens section 12w corresponding to the back-up lamp BUL are integrated into one unit. In addition, plural light sources corresponding to respective lamps, that is, in this embodiment, a light source section 3, in which light-emitting diodes (LED) 31 are arranged and supported on a circuit board 32, is installed in the lamp housing 1. The LEDs 31 are arranged and supported on a surface of the circuit board 32 in a desired array pattern and configured such that light emission from each LED 31 is controlled by a light emission circuit 33 constructed on the circuit board 32. An inner lens 13 made of a colorless or white translucent resin plate, in which desired lens steps are formed in the back surface thereof, is disposed between the light source section 3 and the outer lens 12 and constructed so that light emitted from each LED 31 is refracted at lens steps on the inner lens 13 and irradiated to a front direction of the lamp, that is, a rear direction of the automobile through the outer lens 12.

The power supply device 2 is disposed in a part of the back side of the lamp housing 1. The power supply device 2 includes a power transmission section 21 and a power receiving section 22 that are separately packaged, and the power receiving section 22 is integrally fixed and supported on a part of an inner surface of the lamp body 11 within the lamp housing 1. Here, the power receiving section 22 is fixed on the inner surface of the lamp body 11 with screws or the like. The power receiving section 22 is electrically connected to the light emission circuit 33 provided on the circuit board 32 through an internal harness 4. On the other hand, the power transmission section 21 is disposed and supported so as to be opposed to the power receiving section 22 across the lamp body 11 in a state where the power transmission section 21 is in contact with or in proximity to an outer surface of the lamp body 11. Here, a protection wall 14 in a rectangular tube shape is formed integrally with the outer surface of the lamp body 11 so as to protrude. The power transmission section 21 is inserted into the protection wall 14. A locking lug 2n disposed on a lateral surface of a package of the power transmission section 21 engages with a locking hole 14h of the protection wall 14, and therefore the power transmission section 21 is installed and supported inside the protection wall 14 in a removable manner. The power transmission section 21 is connected to the on-vehicle battery BAT and the lamp control unit LCU through an external harness 5. The lamp control unit LCU is connected to a lamp switch LS that is operated by a vehicle occupant at the time of turning-on, a stop switch SS that outputs a signal when a brake pedal of the automobile is operated, a back-up switch BS that outputs a signal during backing-up of the automobile. The lamp control unit LCU is configured to output necessary lamp control signals when those switches are turned on.

Figure 2:
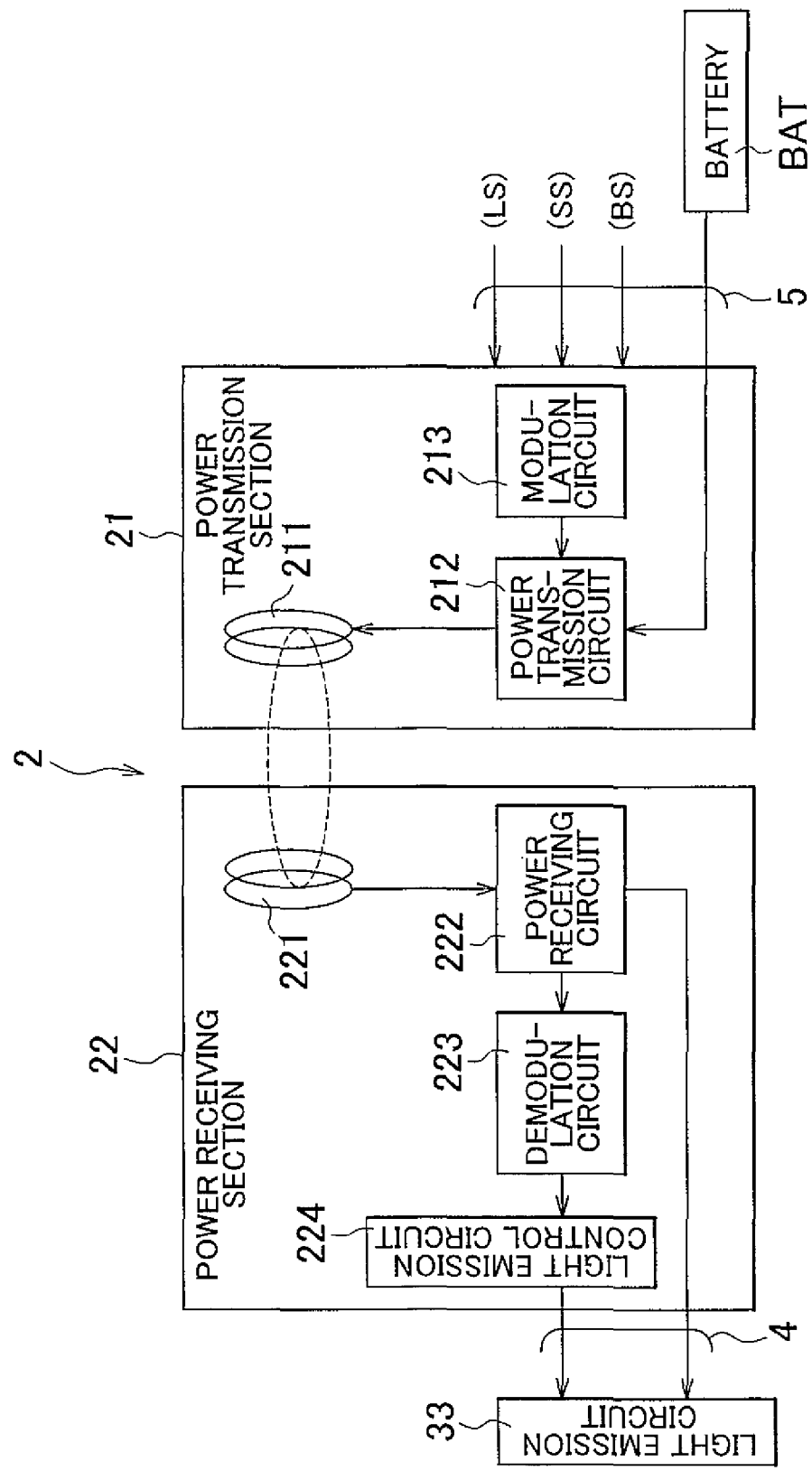
FIG. 2 is a block circuit diagram of the power supply device according to the first embodiment.

FIG. 2 is a block circuit diagram of the power receiving section 22 and the power transmission section 21. The power transmission section 21 includes a power transmission coil 211 that achieves electromagnetic induction with the power receiving section 22, a power transmission circuit 212 that supplies electric power from the on-vehicle battery BAT to the power transmission coil 211 in accordance with the lamp control signal that is output from the lamp control unit LCU, and a modulation circuit 213 that modulates alternating current in accordance with the lamp control signal. In the power transmission section 21, the power transmission circuit 212 is turned on by the lamp control signal to feed the alternating current to the power transmission coil 211 with the use of the electric power of the on-vehicle battery BAT and produces change of magnetic flux in the power transmission coil 211. In addition, the modulation circuit 213 modulates the alternating current that passes through the power transmission coil 211 by a specified modulation method, for example, a frequency modulation method, in accordance with the lamp control signal.

On the other hand, the power receiving section 22 includes a power receiving coil 221 that achieves electromagnetic induction with the power transmission coil 211 of the power transmission section 21, a power receiving circuit 222 that rectifies induced current generated in the power receiving coil 221 to generate electric power to be supplied to the light emission circuit 33 in the lamp housing 1, a demodulation circuit 223 that demodulates the induced current from the power receiving coil 221 to obtain the lamp control signal, and a light emission control circuit 224 that controls the light emission circuit 33 in accordance with the lamp control signal demodulated in the demodulation circuit 223. In the power receiving section 22, the power receiving circuit 222 generates electric power for causing each LED 31 to emit light from the induced current generated in the power receiving coil 221, and at the same time, the demodulation circuit 223 demodulates the lamp control signal from the same induced current as described above to output the lamp control signal to the light emission control circuit 224. The light emission control circuit 224 controls the light emission circuit 33, whereby light emitting state of the each LED 31 is controlled.

The power transmission coil 211 of the power transmission section 21 and the power receiving coil 221 of the power receiving section 22 are disposed as close as possible to each other so as to be opposed to each other across the lamp body 11 and are constructed so that the induced current can be generated in the power receiving coil 221 by the change of magnetic flux produced during energization of the power transmission coil 211 and the efficiency of induced current, or the efficiency of electromagnetic induction, maximally increases. On the other hand, because it suffices that the power transmission section 21 and the power receiving section 22 achieve the electromagnetic induction with each other, and therefore an opening is not required to be provided in the lamp body 11 where the power transmission section 21 and the power receiving section 22 are disposed to be opposed to each other, and the power receiving section 22 does not need to be disposed externally to the lamp body 11.

In the rear combination lamp RCL, when the lamp switch LS in the automobile is turned on, the lamp control unit LCU outputs a lamp lighting signal. Upon receiving the lamp lighting signal, the power transmission section 21 turns on the power transmission circuit 212, and the power transmission circuit 212 feeds the alternating current through the power transmission coil 211 based on the electric power of the on-vehicle battery BAT. At the same time, the modulation circuit 213 modulates the alternating current in accordance with the lamp lighting signal. Accordingly, the alternating current from the power transmission circuit 212 changes the magnetic flux in the power transmission coil 211, and the induced current is generated in the power receiving coil 221 that is magnetically coupled to the power transmission coil 211 by means of the electromagnetic induction associated with the change of magnetic flux. The induced current that is generated in the power receiving coil 221 is rectified in the power receiving circuit 222 and output to the light emission circuit 33. At the same time, the demodulation circuit 223 demodulates the induced current to obtain the lamp lighting signal, and the demodulated lamp lighting signal is output to the light emission control circuit 224. The light emission control circuit 224 controls the light emission circuit 33 with the lamp lighting signal to select the LEDs 31 to be lit and supplies electric power from the power receiving circuit 222 to the selected LEDs 31, that is, in this embodiment, the LEDs 31 of a tail lamp, which is part of the tail and stop lamp T&SL here, to turn the LEDs 31 on. Accordingly, the tail and stop lamp T&SL is lit with a specified luminous intensity.

In this state, when the brake pedal of the automobile is operated, the stop switch SS is switched on, and the lamp control unit LCU outputs a stop lighting signal. The power transmission section 21 modulates the alternating current in the modulation circuit 213 in accordance with the stop lighting signal and feeds the alternating current through the power transmission coil 211. The power receiving section 22 demodulates in the demodulation circuit 223 the stop lighting signal from the induction current generated in the power receiving coil 221 by means of the electromagnetic induction and outputs the stop lighting signal to the light emission control circuit 224. The light emission control circuit 224 controls the light emission circuit 33 with the stop lighting signal to additionally select the LEDs 31 of the stop lamp. Accordingly, the LEDs 31 of the stop lamp are supplied with the electric power from the power receiving circuit 222 and are thus lit, so that the tail and stop lamp T&SL becomes a turn-on state with high luminous intensity.

When the back-up switch BS is switched on as a result of an operation of the transmission of the automobile, the lamp control unit LCU outputs a back-up lighting signal, and the power transmission section 21 modulates the alternating current in the modulation circuit 213 in accordance with the back-up lighting signal and feeds the alternating current through the power transmission coil 211. The power receiving section 22 demodulates in the demodulation circuit 223 the back-up lighting signal from the induction current generated in the power receiving coil 221 by means of the electromagnetic induction and outputs the back-up lighting signal to the light emission control circuit 224. The light emission control circuit 224 controls the light emission circuit 33 with the back-up lighting signal to select the LEDs 31 of the back-up lamp BUL. Accordingly, the LEDs 31 of the back-up lamp BUL are supplied with the electric power from the power receiving circuit 222 and are thus lit, so that the back-up lamp BUL becomes a turn-on state. When the stop lighting signal and the back-up lighting signal are input simultaneously, the modulation circuit 213 performs multiplex modulation of the alternating current in accordance with the both stop and back-up lighting signals.

As described above, in the first embodiment, it is possible to supply electric power from the power transmission section 21 to the power receiving section 22 by means of the electromagnetic induction between the power transmission section 21 that is disposed outside the lamp housing 1 of the rear combination lamp RCL and the power receiving section 22 that is disposed inside the same lamp housing 1, to turn on the rear combination lamp RCL. In addition, it is possible to transmit the lamp control signal, output from the lamp control unit LCU, from the power transmission section 21 to the power receiving section 22, to control lighting of the lamps that constitute the rear combination lamp RCL. Therefore, the lamp housing 1 does not need to be provided with an electric connector or the other conductive means having a conductive contact for supplying electric power, corrosion or deterioration of the conductive contact does not occur by exposure of the conductive contact to the outside of the lamp housing 1, and the deformation of the conductive contact by external forces does not occur. Thus, the power supply device with high electrical and mechanical reliability can be obtained. Furthermore, because the power receiving section 22 is installed inside the lamp housing 1, the lamp housing 1 does not need to be provided with an opening for electrical conduction, and the lamp housing 1 does not need to have waterproof measure or special high strength measures. On the other hand, the power transmission section 21 is inserted in the protection wall 14 and therefore protected from breakage by mechanical external force. Accordingly, the reduction in size and cost of the rear combination lamp RCL can be achieved.

The first embodiment is an example of the rear combination lamp that does not include a turn signal lamp; however, the power supply device according to the present invention can be also applied to the rear combination lamp that includes the turn signal lamp and other auxiliary lamps.

(Second Embodiment)

FIG. 3 is a block circuit diagram of a power supply device according to a second embodiment, equivalent parts to those in the first embodiment are given with the same reference numerals and symbols, and redundant description is not repeated. The second embodiment is different from the first embodiment in that a system for transmitting and receiving the lamp control signal is configured as a separate system from the power transmission circuit 212 and the power receiving circuit 222, that is, a system for transmitting and receiving the lamp control signal is configured as a system for transmitting and receiving a radio signal that is a separate system from a power transmission and receiving system. In other words, the power transmission section 21 includes the power transmission coil 211 and the power transmission circuit 212 as in the case of the first embodiment, and the power transmission section 21 also includes a transmitting-receiving circuit 216 for transmitting and receiving the lamp control signal as a radio signal. The transmitting-receiving circuit 216 is connected to a transmitting-receiving antenna 215 that transmits and receives the radio signal. Similarly, the power receiving section 22 includes the power receiving coil 221 and the power receiving circuit 222 as in the case of the first embodiment, and the power receiving section 22 also includes a transmitting-receiving circuit 226 and a transmitting-receiving antenna 225 for transmitting and receiving the radio signal similar to the first embodiment. The structure of the transmitting-receiving antenna 215 and the transmitting-receiving antenna 225 is not limited as long as the transmitting-receiving antenna 215 and the transmitting-receiving antenna 225 can mutually transmit and receive the radio signal without an opening in the lamp body 11. For example, the antennas 215 and 225 may be made of metal plates that can be installed in the package of the power transmission section and the power receiving section, respectively, and both antennas may be constructed so as to be disposed to be opposed to each other across the lamp body 11.

The second embodiment is the same as the first embodiment in that the power transmission circuit 212 of the power transmission section 21 is turned on by the lamp lighting signal (LS) from the lamp control unit LCU to feed the alternating current through the power transmission coil 211, and the electric power for lighting the lamp is supplied by the induced current produced by means of the electromagnetic induction between the power transmission coil 211 and the power receiving coil 221 of the power receiving section 22. On the other hand, the lamp lighting signal (LS), the stop lighting signal (SS), and the back-up lighting signal (BS) from the lamp control unit LCU are modulated to the radio signal in the transmitting-receiving circuit 216 of the power transmission section 21, and the radio signal is transmitted from the transmitting-receiving antenna 215. The transmitted radio signal is received by the transmitting-receiving antenna 225 of the power receiving section 22 and demodulated to the lamp lighting signal, the stop lighting signal, and the back-up lighting signal in the transmitting-receiving circuit 226. Those lighting signals are output to the light emission control circuit 224. The light emission control circuit 224 controls the light emission circuit 33 in accordance with the lighting signals and selects the LEDs 31 that are to be supplied with electric power from the power receiving circuit 222, whereby the tail lamp, the stop lamp, and the back-up lamp are lit.

Also in the second embodiment, the power receiving section 22 is installed in the lamp housing 1, the lamp housing 1 does not need to be provided with an electric connector or the other conductive means having a conductive contact for supplying electric power, corrosion or deterioration of the conductive contact does not occur by exposure of the conductive contact to the outside of the lamp housing 1, and the deformation of the conductive contact by external forces does not occur. Thus, the power supply device with high reliability can be obtained. In addition, the lamp housing 1 does not need to be provided with an opening for electrical conduction, and the lamp housing 1 does not need to have waterproof measure or special high strength measures. Accordingly, the reduction in size and cost of the rear combination lamp RCL can be achieved.

Furthermore, the second embodiment is provided with the transmitting-receiving circuits 216 and 226 for transmitting and receiving the radio signal which have the structures separate from the power transmission circuit 212 and the power receiving circuit 222 for supplying electric power by means of the electromagnetic induction, and the lamp control signal is transmitted from the power transmission section 21 to the power receiving section 22 by the transmitting-receiving circuits 216 and 226. Therefore, the second embodiment can use an existing radio transmitting-receiving means almost as is to construct the power transmission section 21 and the power receiving section 22, so that it is possible to simplify the structure of the power transmission section 21 and the power receiving section 22, and achieve the cost reduction. In addition, the transmitting-receiving circuits 216 and 226 can be used for backward communications between the power transmission section 21 and the power receiving section 22, an abnormal signal that is output in accordance with an anomaly occurred in the power receiving section 22, for example, can be transmitted from the power receiving section 22 to the power transmission section 21 and further fed back from the power transmission section 21 to the lamp control unit LCU, which enables the lamp control unit LCU to monitor the power receiving section 22, so that it is made possible to take suitable countermeasure immediately against the occurrence of failures. This is effective in securing further reliability of the power supply device.

(Third Embodiment)

Figure 4A:
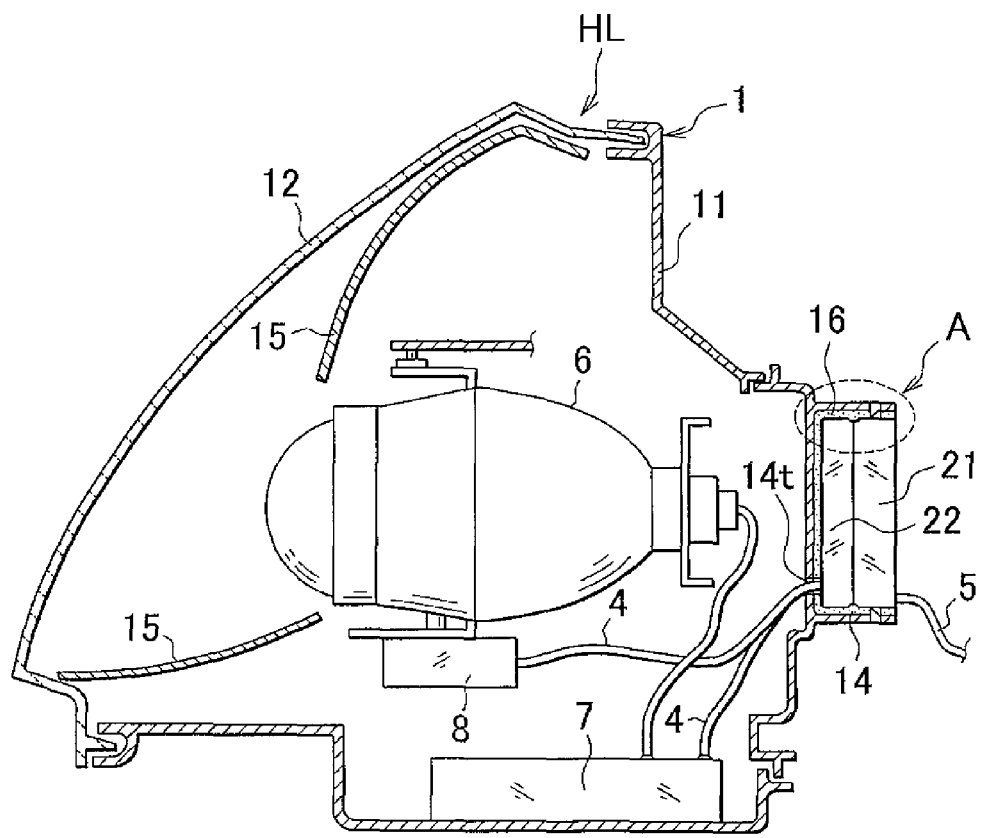
FIG. 4 includes cross-sectional views that show a schematic configuration of a third embodiment in which a power supply device according to the present invention is applied to a headlamp.

FIG. 4A is a vertical cross-sectional view of the third embodiment according to the present invention that is applied to a headlamp HL of an automobile, and the part equivalent to that of the first embodiment is given with the same reference numerals and symbols. The headlamp HL includes a projector type lamp unit 6 that is installed in a lamp housing 1 formed of a lamp body 11 and an outer lens 12 and integrally incorporates a lamp lighting circuit unit 7 for lighting the lamp unit 6 and a swivel actuator 8 for swiveling the lamp unit 6 in lateral directions. The lamp unit 6, the lamp lighting circuit unit 7, and the swivel actuator 8 have been already proposed, and therefore the detailed descriptions of those devices are not made herein. Herein, the lamp unit 6 is configured to switch between a high beam light distribution and a low beam light distribution by changing the emission of light of a built-in light source. In addition, an extension 15 that covers around the lamp unit 6 is provided in order to improve the appearance of the head lamp HL. The power receiving section 22 is integrally disposed on a part of the back side of the lamp housing 1, that is, the outer surface of the lamp body 11 in this embodiment, and the power transmission section 21 is removably supported in the lamp body 11 so as to be opposed to the power receiving section 22.

Figure 4B:
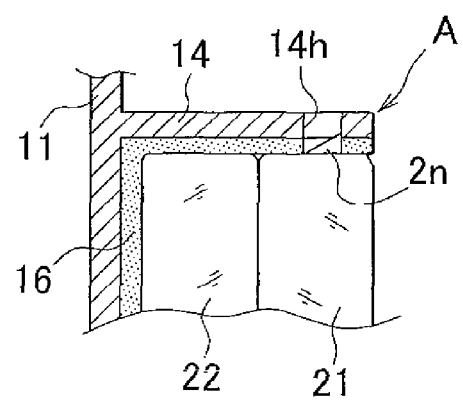

In order to support the power transmission section 21 and the power receiving section 22, the third embodiment is provided with a protection wall 14 that is formed on the outer surface of the lamp body 11 so as to protrude in a tubular shape, as in the case of the first embodiment. The power receiving section 22 is inserted from the outside to the inside of the protection wall 14, the internal harness 4 of the power receiving section 22 is inserted into a small insertion opening 14t provided in an internal bottom surface of the protection wall 14, and electric connection to the lamp lighting circuit unit 7 and the swivel actuator 8 is established. Through the structure described above, the power receiving section 22 is disposed integrally with the lamp body 11. The power transmission section 21 is removable from the insertion state into the protection wall 14, as in the case of the first embodiment, and is disposed to be opposed to the power receiving section 22 in a state where the power transmission section 21 is in contact with or in proximity to the power receiving section 22 when mounted. In the headlamp HL, because emitting luminous intensity of the lamp unit 6 is high and supplied electric power is therefore high, electric field intensity or magnetic field strength that is produced in the electromagnetic induction between the power transmission section 21 and the power receiving section 22 becomes very high. Thus, electromagnetic interference (EMI) on the lamp control unit LCU or other electrical components mounted on the automobile cannot be ignored. Herein, as shown in FIG. 4B that is an enlarged view of a section A in FIG. 4A, an electromagnetic wave absorption material 16 such as ferrite is attached on the internal bottom surface and the inner side surface of the protection wall 14, so that the protection wall 14 is configured to function as an electromagnetic shield wall.

In the third embodiment, the circuit structure of the power transmission section 21 and the power receiving section 22 may be the same as that of the first embodiment or the second embodiment. Here, as shown in FIG. 5, a configuration using the power transmission section 21 and the power receiving section 22 of the second embodiment is employed. Besides, the power transmission section 21 receives from the lamp control unit LCU the lamp lighting signal based on a lamp switch LS for lighting the headlamp HL, a light distribution control signal based on a light distribution selector switch HS for changing the high beam light distribution and the low beam light distribution, and a swivel control signal based on a swivel control switch SVS for performing the swivel control. In addition, the power receiving section 22 includes a light emission control circuit 224 for controlling the lamp lighting circuit unit 7 in accordance with the received light distribution control signal, and a swivel control circuit 227 for controlling the swivel actuator 8 in accordance with the swivel control signal is also provided. The swivel control circuit 227 can be omitted in the case where the swivel control circuit 227 is integrated with the swivel actuator 8.

As in the case of the second embodiment, in the third embodiment, it is as a matter of course that the power transmission section 21 supplies the electric power from the power transmission circuit 212 to the power receiving circuit 222 of the power receiving section 22 in accordance with the lamp lighting signal and the power receiving section 22 supplies the electric power to the headlamp HL. In addition, in accordance with the lamp lighting signal and the light distribution control signal from the lamp control unit LCU which are transmitted from the transmitting-receiving circuit 216 of the power transmission section 21 to the transmitting-receiving circuit 226 of the power receiving section 22, the light emission control circuit 224 can control the lamp lighting circuit unit 7, so that it is possible to control the light source of the lamp unit 6 that emits light, to control the lighting and the light distribution of the lamp. Furthermore, in accordance with the swivel control signal that is transmitted by the transmitting-receiving circuit 216 or 226, the swivel control circuit 227 can control the swivel actuator 8, so that it is possible to perform the swivel control of an illumination optical axis direction of the lamp unit 6. The electric power that is obtained in the power receiving circuit 222 is used as the electric power to drive the swivel actuator 8. Although not shown in the drawings, in the headlamp that includes a variable shade for controlling the light distribution of the lamp unit 6 and a leveling actuator for controlling the illumination optical axis of the lamp unit 6 in vertical directions, the electric power can be supplied to the variable shade and the leveling actuator to perform control thereof in the similar manner.

In the third embodiment, because the power transmission section 21 and the power receiving section 22 are inserted into the protection wall 14 and the electromagnetic wave absorption material 16 provided on the protection wall 14 encloses the surroundings to provide electromagnetic shielding, the electromagnetic wave absorption material 16 can reduce the amount of leakage of the electric field and the magnetic field produced by means of the electromagnetic induction out of the protection wall 14 when a large amount of electric power is supplied in order to light the lamp unit 6 of the headlamp HL with high luminous intensity, and the EMI on the lamp control unit LCU or other electrical components can be controlled. In addition, the area where the power transmission section 21 and the power receiving section 22 are opposed to each other is surrounded by the protection wall 14, and therefore dust is inhibited to enter into the area, which prevents the efficiency of the electromagnetic induction from decreasing. Furthermore, the insertion opening 14*t* provided in the internal bottom surface of the protection wall 14 through which the internal harness 4 is inserted is closed by the protection wall 14 and the power receiving section 22, and therefore it is effective in securing a waterproof property in the lamp housing 1.

The third embodiment is an example of a headlamp in which the projector type lamp unit is installed; however, a reflector type lamp unit may be installed in the headlamp. In addition, the type of the light source of the lamp unit is not limited particularly. Light emitting elements such as incandescent bulbs, discharge bulbs, or LEDs can be employed. However, when the fact that the entire lamp easily becomes large in size when it is required to supply a large amount of electric power is considered from the viewpoint of the power supply efficiency in the electromagnetic induction between the power transmission section and the power receiving section, it is preferable to employ a lamp unit using LEDs that emit light with low power, as the light source.

The first, the second, and the third embodiments show the structure in which the coil and the antenna are packaged in one body in each of the power transmission section and the power receiving section; however, the coil and the antenna may be provided separately from the circuit section. Particularly, in the third embodiment, only the coil and the antenna may be provided outside the lamp housing, and the circuit and the like may be provided inside the lamp housing.

The present invention is applicable to a power supply device for supplying electric power from a power source that is mounted on a vehicle to a lamp that is disposed in the vehicle. Particularly, the present invention is preferably applied to a lamp configured such that a harness connected to the power source is electrically connected after the lamp is assembled to the vehicle during manufacture of the vehicle or during maintenance of the lamp.

In the present invention, the power transmission section and the power receiving section may be electrically coupled to each other by means of the electromagnetic induction. In addition, the power receiving section may be installed in the lamp housing of the lamp. Furthermore, the lamp may include the protection wall that encloses at least one of the power transmission section and the power receiving section, and the protection wall may be constructed as a wall that has at least one of the function of dust proofing and the function of radio shielding.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. A power supply device that supplies electric power from a power source mounted on a vehicle to a lamp disposed in the vehicle that is one of a lamp disposed in a rear of a vehicle body and a headlamp, the power supply device comprising:
   a power transmission section that is provided in the vehicle and configured to transmit the electric power of the power source; and
   a power receiving section that is provided so as to be integral with the lamp and configured to receive the electric power from the power transmission section, wherein the power transmission section and the power receiving section are disposed to be opposed to each other and electrically coupled wirelessly; wherein the lamp includes a protection wall that encloses at least one of the power transmission section and the power receiving section, and the protection wall has at least one of a function of dust proofing and a function of radio shielding; and the lamp includes the protection wall that has a tube shape and protrudes from an outer surface of a lamp housing of the lamp, and the power transmission section is inserted into the protection wall.

2. The power supply device for a vehicle lamp according to claim 1, wherein the power transmission section and the power receiving section are electrically coupled by electromagnetic induction.

3. The power supply device for a vehicle lamp according to claim 1, wherein the power receiving section is installed in a lamp housing of the lamp.

4. A vehicle lamp that is one of a lamp disposed in a rear of a vehicle body and a headlamp, the vehicle lamp comprising the power supply device according to claim 1.

5. The vehicle lamp according to claim 4, wherein the vehicle lamp does not have an opening in which a conductive wire is inserted.

6. The power supply device for a vehicle lamp according to claim 1, wherein the lamp includes the protection wall that has the function of the radio shielding.

7. The power supply device for a vehicle lamp according to claim 1, wherein an insertion opening is provided in an internal bottom surface of the protection wall, and an internal harness of the power receiving section is inserted into the insertion opening to establish electric connection between the power receiving section and the lamp.

8. A vehicle lamp comprising:
a light source;
a lamp housing that accommodates the light source inside; and a power receiving section that is provided so as to be integral with the lamp housing and is configured to receive electric power wirelessly to supply the electric power to the light source; wherein the lamp housing includes a protection wall that encloses at least one of the power transmission section and the power receiving section, and the protection wall has at least one of a function of dust proofing and a function of radio shielding. and the lamp housing includes the protection wall that has a tube shape and protrudes from an outer surface of the lamp housing, and the power transmission section is inserted into the protection wall.

9. The vehicle lamp according to claim 8, further comprising:

a power transmission section that is provided outside the lamp housing and is configured to be connected to a power source to transmit electric power of the power source wirelessly, wherein the power transmission section and the power receiving section are disposed to be opposed to each other and electrically coupled wirelessly.

10. The vehicle lamp according to claim 9, wherein the power transmission section and the power receiving section are electrically coupled by electromagnetic induction.

11. The vehicle lamp according to claim 8, wherein the power receiving section is installed in the lamp housing.

12. The vehicle lamp according to claim 8, wherein the lamp housing does not have an opening in which a conductive wire is inserted.

13. The vehicle lamp according to claim 8, wherein the lamp housing includes the protection wall that has the function of the radio shielding.

14. The vehicle lamp according to claim 8, wherein an insertion opening is provided in an internal bottom surface of the protection wall, and an internal harness of the power receiving section is inserted into the insertion opening to establish electric connection between the power receiving section and the lamp housing.

* * * * *